United States Patent
Wolf et al.

(10) Patent No.: US 9,268,011 B2
(45) Date of Patent: Feb. 23, 2016

(54) CERAMIC OPTICAL SYSTEM SUPPORT

(75) Inventors: Peter Wolf, Leinfelden-Echterdingen (DE); Uwe Skultety-Betz, Leinfelden-Echterdingen (DE); Joerg Stierle, Waldenbuch (DE)

(73) Assignee: Robert Bosch GmbH, Stuttgart, DE (US)

( * ) Notice: Subject to any disclaimer, the term of this patent is extended or adjusted under 35 U.S.C. 154(b) by 0 days.

(21) Appl. No.: 13/259,720

(22) PCT Filed: Jan. 26, 2010

(86) PCT No.: PCT/EP2010/050818
§ 371 (c)(1),
(2), (4) Date: Dec. 5, 2011

(87) PCT Pub. No.: WO2010/108705
PCT Pub. Date: Sep. 30, 2010

(65) Prior Publication Data
US 2012/0069457 A1    Mar. 22, 2012

(30) Foreign Application Priority Data

Mar. 23, 2009 (DE) .......................... 10 2009 001 734

(51) Int. Cl.
*G02B 7/02* (2006.01)
*G01S 7/481* (2006.01)
*G01S 17/08* (2006.01)

(52) U.S. Cl.
CPC .............. *G01S 7/4813* (2013.01); *G01S 17/08* (2013.01)

(58) Field of Classification Search
CPC . G01J 2001/4247; G01B 11/00; G01L 11/02; G02B 23/16; G02B 6/3807; G02B 6/3833; G02B 6/385; G02B 6/4292

USPC ......... 359/811, 815, 818, 819, 829, 830, 351; 73/313, 514.26
See application file for complete search history.

(56) References Cited

U.S. PATENT DOCUMENTS

| 5,247,172 | A * | 9/1993 | Riemer .................... 250/227.21 |
| 7,350,988 | B2* | 4/2008 | Nagasaka et al. ............... 385/94 |
| 2003/0026556 | A1 | 2/2003 | Mazotti et al. |
| 2007/0114553 | A1 | 5/2007 | Nagasaka et al. |
| 2007/0212002 | A1* | 9/2007 | Sato ................... 385/92 |
| 2009/0010653 | A1* | 1/2009 | Aoki ............................ 398/135 |
| 2010/0030380 | A1* | 2/2010 | Shah et al. .................... 700/258 |
| 2011/0069398 | A1* | 3/2011 | Ning et al. .................... 359/715 |

FOREIGN PATENT DOCUMENTS

| CN | 1967889 A | 5/2007 |
| CN | 101258419 A | 9/2008 |
| DE | 10 2005 041 980 | 3/2007 |
| SU | 1698037 A1 | 1/1989 |
| SU | 1744686 A1 | 8/1990 |
| WO | 2009/012474 | 1/2009 |

OTHER PUBLICATIONS

International Search Report corresponding to PCT Application No. PCT/EP2010/050818, mailed Jun. 23, 2010 (German and English language document) (7 pages).

* cited by examiner

*Primary Examiner* — Mahidere Sahle
(74) *Attorney, Agent, or Firm* — Maginot, Moore & Beck LLP

(57) ABSTRACT

An optical system support, especially for an optical measuring device, includes a base on which a mechanism for fixing an electro-optical transceiver system is provided. The optical system support is a ceramic optical system support.

14 Claims, 4 Drawing Sheets

CERAMIC OPTICAL SYSTEM SUPPORT

This application is a 35 U.S.C. §371 National Stage Application of PCT/EP2010/050818, filed Jan. 26, 2010, which claims the benefit of priority to Application Serial No. DE 10 2009 001 734.8, filed Mar. 23, 2009 in Germany, the disclosures of which are incorporated herein by reference in their entirety.

BACKGROUND

The present disclosure relates to an optical system support, especially for an optical measuring device, comprising a basic body on which means for fixing components of an electrooptical transceiver system are provided. Furthermore, the present disclosure relates to a production process for such an optical system support. In addition, the present disclosure relates to an optical measuring device, especially a laser rangefinder, comprising a lens holder, an optical system support and a transceiver system.

DE 10 2005 041 980 A1 discloses an optical measuring device for laser rangefinding which is designed as a handheld device. Provided as a central element in the laser rangefinder is an optical system support made of plastic, on which an electrooptical transceiver system is held. For this purpose, the optical system support has receptacles and fastening means for the optical and/or electronic components of the measuring device. For instance, a lens holder with a receptacle for a receiving optical system is provided integrally on the front region of the optical system support. Furthermore, a printed circuit board, with a laser diode with a collimator lens mounted in front of it for producing a laser beam and a light-sensitive receiving diode, is held on the optical system support. The printed circuit board is positioned in the measuring device in such a way that the laser diode can emit the light beam through the transmitting optical system and the light-sensitive receiving diode is positioned at the focal point of the receiving optical system. To improve the measuring accuracy and to reduce measuring errors, the light paths for transmitting and receiving are arranged in parallel. As a result, external influences on the optical system support act on the two light paths equally.

The optical system support with the electrooptical transceiver system fixed thereto is mounted together with a display device, an input device and an energy supply device in a common housing. During operation, the laser rangefinder is actuated by way of the input device. Then, a laser beam is emitted from the laser diode onto an item from which the distance is to be measured. The point of light projected onto the item is concentrated on the light-sensitive receiving diode and evaluated by means of the receiving optical system. The distance value obtained by the measurement is output by way of the display device.

In practice, optical measuring devices have to meet high requirements for their mechanical load-bearing capacity. Already during assembly, forces that may lead to deformations may act on the optical system support. During use, the device may also be exposed to shocks and thus be deformed. This can only be compensated or prevented partly by structural design measures. For handheld optical measuring devices especially, there are limits to this on account of their functional purpose. For instance, steel is in fact a suitable material since it has a great modulus of elasticity (see Table 1). Diecast aluminum and cast magnesium are less suitable in this respect and plastic has the lowest modulus of elasticity. However, for reasons of weight, the use of steel is disadvantageous, since it is the heaviest of the materials listed in Table 1.

TABLE 1

| Material | Modulus of elasticity |
| --- | --- |
| Steel (bent plate part, St 37) | 210000 N/mm$^2$ |
| Diecast aluminum (GD-AlSi 12) | 75000 N/mm$^2$ |
| Cast magnesium (GD-MgAl5) | 50000 N/mm$^2$ |
| Plastic (PPS-GF40) | 13000 N/mm$^2$ |

Furthermore, the measuring devices are subjected to thermal influences, for example by solar irradiation. If the optical system support is fixedly connected to the housing, this may lead to bending if it is heated on one side, whereby the optical system support is deformed and the measuring accuracy is reduced. It is therefore desirable that the material has on the one hand a high thermal conductivity and on the other hand a low coefficient of thermal expansion. As can be seen from Table 2, this combination is the most suitable in the case of steel, while it is the least suitable in the case of plastic.

TABLE 2

| Material | Thermal conductivity | Coefficient of thermal expansion |
| --- | --- | --- |
| Steel (bent plate part, St 37) | 48-58 W/mK | 13 μm/mK |
| Diecast aluminum (GD-AlSi 12) | 160 W/mK | 21 μm/mK |
| Cast magnesium (GD-MgAl5) | 200 W/mK | 26 μm/mK |
| Plastic (PPS-GF40) | 0.3 W/mK | 20-40 μm/mK |

Since the electrooptical transceiver system contains electronic components which, on account of the modulation frequencies that are used of up to 1 GHz, generate an electromagnetic radiation, requirements for electromagnetic compatibility must also be observed.

Although, in principle, the optical system support can serve as a shielding if it is produced from conducting material, this is difficult on account of the high modulation frequencies that are used. Therefore, the optical system support should be produced from a material with a low electrical conductivity, with the result that it cannot itself act as an antenna for the electrooptical transceiver system, and consequently does not contribute to the radiation. The metallic materials steel, diecast aluminum and cast magnesium all have a high conductivity, with the result that they are less suitable from the aspect of electromagnetic compatibility. Only plastic, as an insulator, is well suited for this.

TABLE 3

| Material | Electrical conductivity |
| --- | --- |
| Steel (bent plate part, St 37) | about 10 m/ohms mm$^2$ |
| Diecast aluminum (GD-AlSi 12) | 19-22 m/ohms mm$^2$ |
| Cast magnesium (GD-MgAl5) | 8 m/ohms mm$^2$ |
| Plastic (PPS-GF40) | insulated |

In addition, the optical system supports produced by diecasting or injection diecasting have production-related internal stresses. This effect is also present in principle in the case of bent steel plate parts. These internal stresses relax during the lifetime and with temperature, so that over time there is a misalignment of the optical system.

Depending on the materials that are used, production-related accuracy limits are predetermined for the optical system support, and consequently for the optical measuring device.

The production-related accuracy is lowest in the case of diecast aluminum and increases through cast magnesium and plastic to steel.

In the assembly of the optical measuring device, adhesive is often used, since adhesive bonding largely avoids stresses in the optical system support being caused by assembly and can be carried out with low costs and high accuracy. Cast metal materials are generally less suitable for this than steel or plastic, since they generally have poorer adhesive bonding properties. The use of adhesives is also restricted since, for example, metals are not transparent, with the result that it is not possible to use light-curing adhesive to carry out the adhesive bonding operation more quickly. Only plastics materials can be produced in a transparent form allowing a light-curing adhesive to be used.

Altogether, it can be stated that no material meets all the desired requirements. The most suitable materials appear to be steel or plastic, plastic being disadvantageous in particular with respect to its stability and thermal properties, whereas steel is critical in particular with regard to electromagnetic compatibility. In addition, the internal stress in particular must be regarded as disadvantageous in the case of all the materials previously used.

It is therefore an object of the present disclosure to provide an optical system support that has simultaneously a high mechanical and thermal load-bearing capacity, good electromagnetic compatibility, a long lifetime, can be produced with high accuracy and can be easily assembled.

SUMMARY

This object is achieved according to the disclosure by the optical system support being a ceramic optical system support which is produced with preference by the ceramic injection molding process. This production process makes it possible to make complex components from ceramic materials not previously possible with conventional ceramic production processes. $Al_2O_3$ and a mixture of $Al_2O_3$ and $ZrO_3$ have proven to be suitable materials for this.

Ceramic materials are distinguished in comparison with the materials previously used by a particularly high strength. When $Al_2O_3$ is used, the modulus of elasticity is 390 000 $N/m^2$. The thermal properties of this ceramic are also well suited, since with a high thermal conductivity of 30 W/mK it only has a coefficient of thermal expansion of 8.2 μm/mK. Consequently, the thermal expansion is particularly low, while at the same time the high thermal conductivity brings about a uniform distribution of the heat over the entire optical system support. As a result, when heated, the optical system support undergoes a uniform change in length without deformations. Furthermore, ceramic is an insulator, with the result that there is no risk of electromagnetic incompatibility through the optical system support. In addition, the ceramic has a high adhesiveness, which is superior to all the materials previously used.

Since ceramic components are sintered during production, that is to say are hardened at a high temperature, they are virtually stress-free, with the result that there is no misalignment of the optical system caused by relaxation of stresses. Furthermore, the production-related accuracy of ceramic in the ceramic injection molding process is particularly high and equivalent to the accuracy when steel is used.

The overall result is that a ceramic optical system support is superior to an optical system support of conventional materials in virtually all the aspects mentioned.

In a further configuration of the disclosure, the optical system support may be produced from a ceramic that is at least partially transparent, at least in one wavelength range, in particular a UV-transparent ceramic. This makes it possible to use light-curing adhesives for mounting on the optical system support other components that are themselves not transparent. Such adhesives are widely used in the prior art and, because of their easy handling, are well suited for an adhesively bonding connection process. For example, when using an $Al_2O_3$ ceramic, adequate exposure is possible with a maximum material thickness of 2 mm, $Al_2O_3$ being partially transparent to a wide wavelength range that comprises wavelengths from 350 nm to 635 nm.

Furthermore, a lens holder may be formed integrally with the optical system support. The one-part configuration reduces the production tolerances occurring, and the lenses held in the lens holder are held on the optical system support with improved strength. In addition, this dispenses with an assembly step for connecting the lens holder and the optical system support, which reduces the production costs for the optical measuring device and the reject rate.

In the case of an alternative configuration of the disclosure, a lens holder may be separately provided and able to be connected to the optical system support, the lens holder being formed with a tubular receptacle for at least one lens. In particular, the tubular receptacle may be designed for receiving two lenses lying one behind the other. This allows even complex optical properties to be realized in the lens holder. For production reasons, it has proven to be advantageous in this case to insert the lenses into the lens holder respectively from the opposite end regions. Thus, the choice of lenses that can be used is not restricted to those that can be mounted on the outer side through the receptacle.

In addition, the optical system support may have on its basic body at least one axial projection and an electrooptical transceiver unit may have a recess corresponding to the projection of the basic body, which projection and recess engage in one another in the assembled state. In this case, the electrooptical transceiver unit may comprise a printed circuit board in which the recess is provided. This facilitates the mounting of the electrooptical transceiver unit on the basic body and increases the positioning accuracy. Arranged on the printed circuit board are a laser diode and a light-sensitive diode, for example an APD, for the transmitting and receiving of light. In this case, the projections and recesses are preferably arranged in the vicinity of the laser diode, in order that particularly accurate positioning is achieved for the latter.

Positioning and fastening elements, with which a lens, in particular a collimator lens, can be mounted on the basic body, may also be provided on the outer side of the basic body. The direct connection to the basic body allows the collimator lens to be easily mounted, in particular by an adhesive bonding process.

Finally, in the basic body there may be provided at least one receptacle, which extends between the end regions and into which a tube with a bandpass filter can be inserted. This allows the tube to be easily positioned in the optical path and allows additional optical elements to be introduced into the optical path. The use of a tube with a tubular enclosure allows shielding of the optical path to be ensured.

BRIEF DESCRIPTION OF THE DRAWINGS

With regard to further advantageous configurations of the disclosure, reference is made to the dependent claims and the following description of the exemplary embodiments with reference to the accompanying drawing, in which:

DETAILED DESCRIPTION

Figure 1:
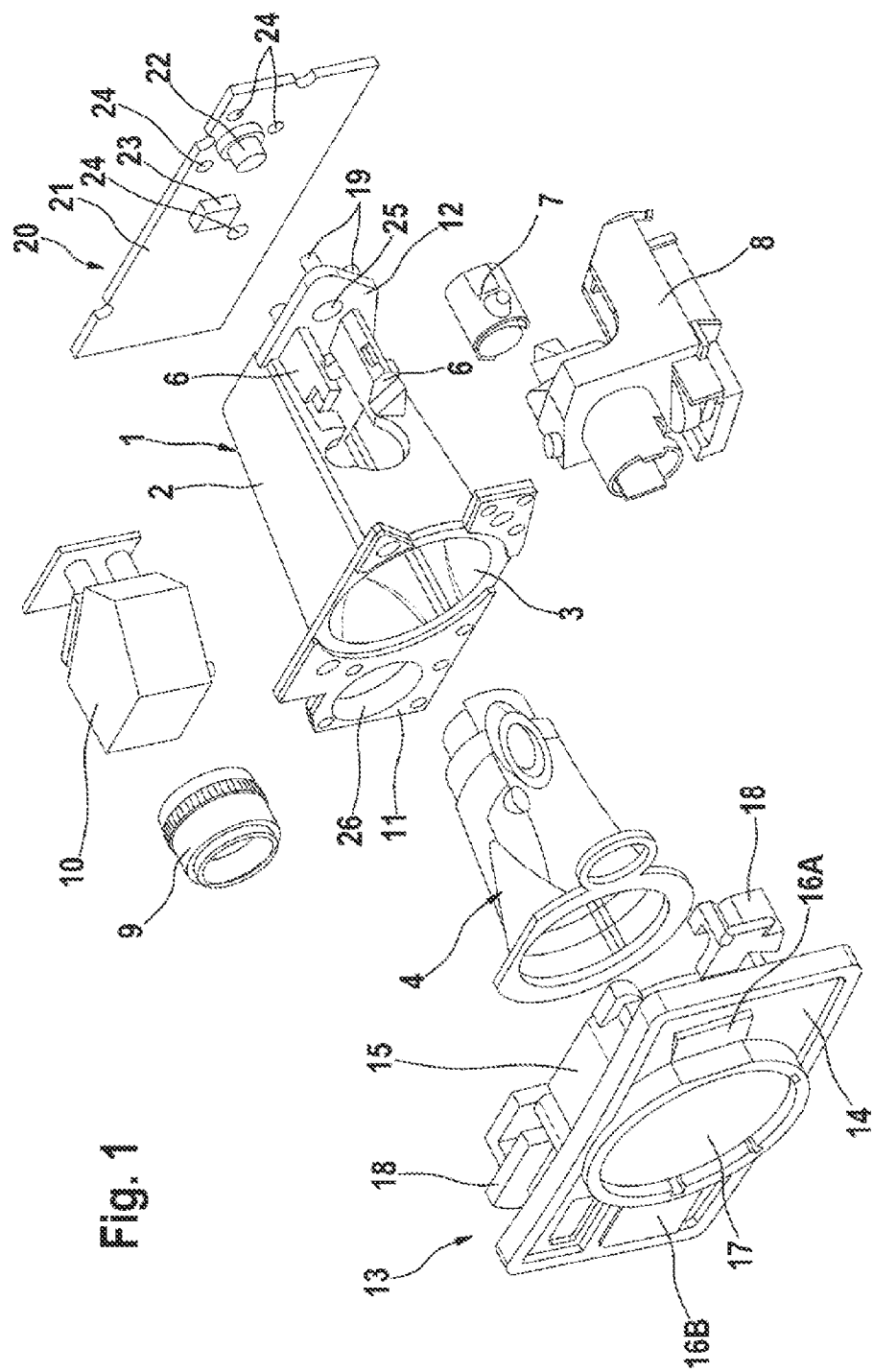
FIG. 1 shows an optical system support with a transceiver system as provided by a first embodiment of the present disclosure, in an exploded representation.
Figure 2:
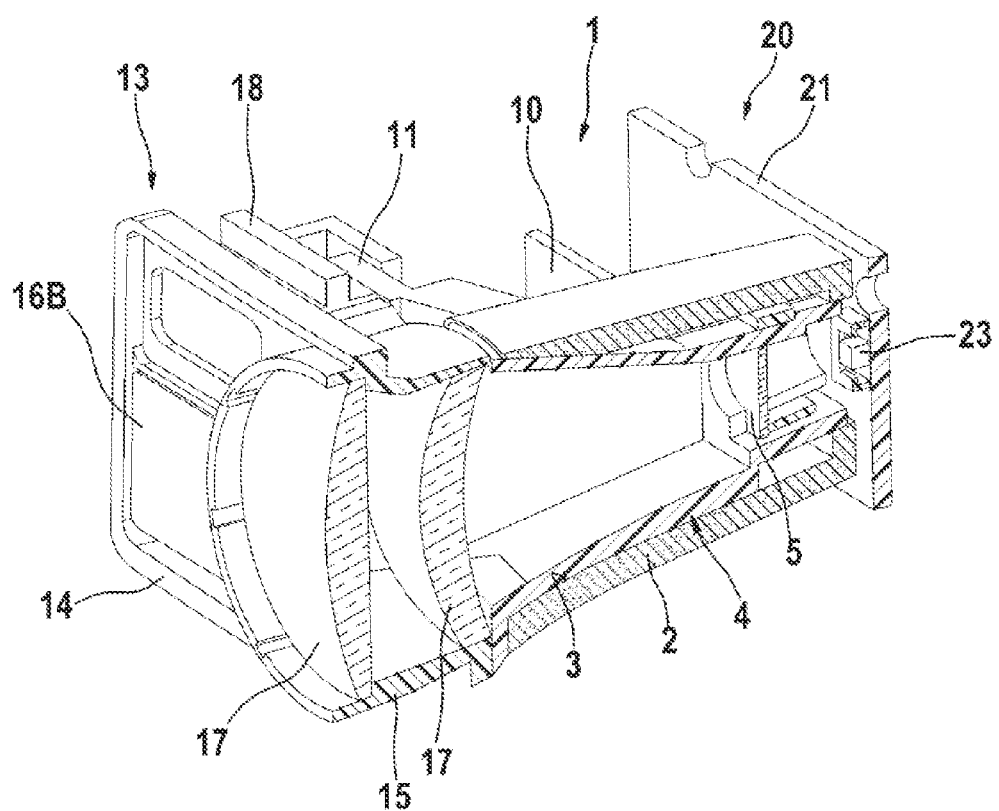
FIG. 2 shows the subassembly from FIG. 1 with optical components attached thereto, as a longitudinal section.

FIGS. 1 and 2 show an optical system support 1 with a transceiver system for a laser rangefinder M as provided by a first embodiment of the present disclosure. The optical system support 1 consists of an $Al_2O_3$ ceramic and is produced by the ceramic injection molding process. Alternatively, the use of a ceramic comprising $Al_2O_3$ and $ZrO_3$ is also possible.

The optical system support 1 comprises a basic body 2 with a tubular receptacle 3, which passes axially through the basic body 2. Inserted in the tubular receptacle 3 is a tube 4 with a bandpass filter 5 held therein. Provided laterally on the optical system support 1 are two positioning and fastening elements 6, with which a collimator lens with a holder 7 is positioned on the basic body 2 and fixed thereon by an adhesively bonding connection. A reference flap element 8 is also fastened to the optical system support 1, on the side of the collimator lens with the holder 7. A target optical system module with wedge prisms 9 and a redirecting prism with a printed circuit board 10 is provided on the opposite side of the basic body 2. On the end faces, the basic body 2 has two end flanges 11, 12.

Fastened to the front end flange 11 is a lens holder 13. This comprises a front plate 14, in which a tubular receptacle 15 as well as a right-hand and a left-hand side window 16A, 16B are provided. Held in the tubular receptacle 15 are two lenses 17. Furthermore, the lens holder 13 has two lateral fastening elements 18 with a U-shaped cross section, with which it is fitted onto the front end flange 11 of the optical system support 1. In the connecting region, the fastening elements 18 are fixedly bonded to the front end flange 11.

The rear end flange 12 is formed with four projections 19 extending away from the basic body 2, of which only three can be seen in the drawing, for mounting a transceiver unit 20. The transceiver unit 20 comprises a printed circuit board 21, the side of which that is facing the optical system support 1 bearing a laser diode 22 and a light-sensitive diode (APD) 23. Provided in the printed circuit board 21 are four circular connecting holes 24, which correspond to the projections 19 on the rear flange 12. During assembly, the projections 19 are brought into engagement with the connecting holes 24 and the transceiver unit 20 is fixed on the rear end flange 12 of the optical system support 1 by an adhesively bonding connection.

In the assembled state, the laser diode 22, a passage 25 through the rear end flange 12, the collimator lens with the holder 7, the reference flap element 18 and the right-hand window 16A lie on an axis which forms a transmitting path for the light emitted by the laser diode 22. In this case, the collimator lens 7 serves the purpose of concentrating the light transmitted by the laser diode 22 into a parallel beam. In the reference flap element 8, a reference measurement of the transmitted laser light is carried out for the adjustment of the laser rangefinder M. The laser beam leaves unchanged through the right-hand window 16A, into which a pane has been inserted as a lens.

The transmitted laser light produces on an item (not shown) a point of light, which is sensed by the laser rangefinder M. Serving for this purpose is a receiving path, which extends through the two lenses 17 and the tube 4 with the bandpass filter 5 contained therein to the light-sensitive diode 23. The two lenses 17 bring about a focusing of the impinging light onto the light-sensitive diode 23. As the light passes through the bandpass filter 5, components with a wavelength that is different from the light transmitted through the laser diode 22 are largely filtered out, with the result that only light transmitted by the laser diode 22 impinges on the light-sensitive diode 23 and is sensed there.

An optical target measuring path extends along an axis which is formed by the left-hand window 16B, a through-opening 26 in the front end flange 11, the wedge prisms 9 and the redirecting prism with the printed circuit board 10. This allows the item that is to be measured to be aimed at exactly and it can be ensured that the laser impinges on the desired item.

Figure 3:
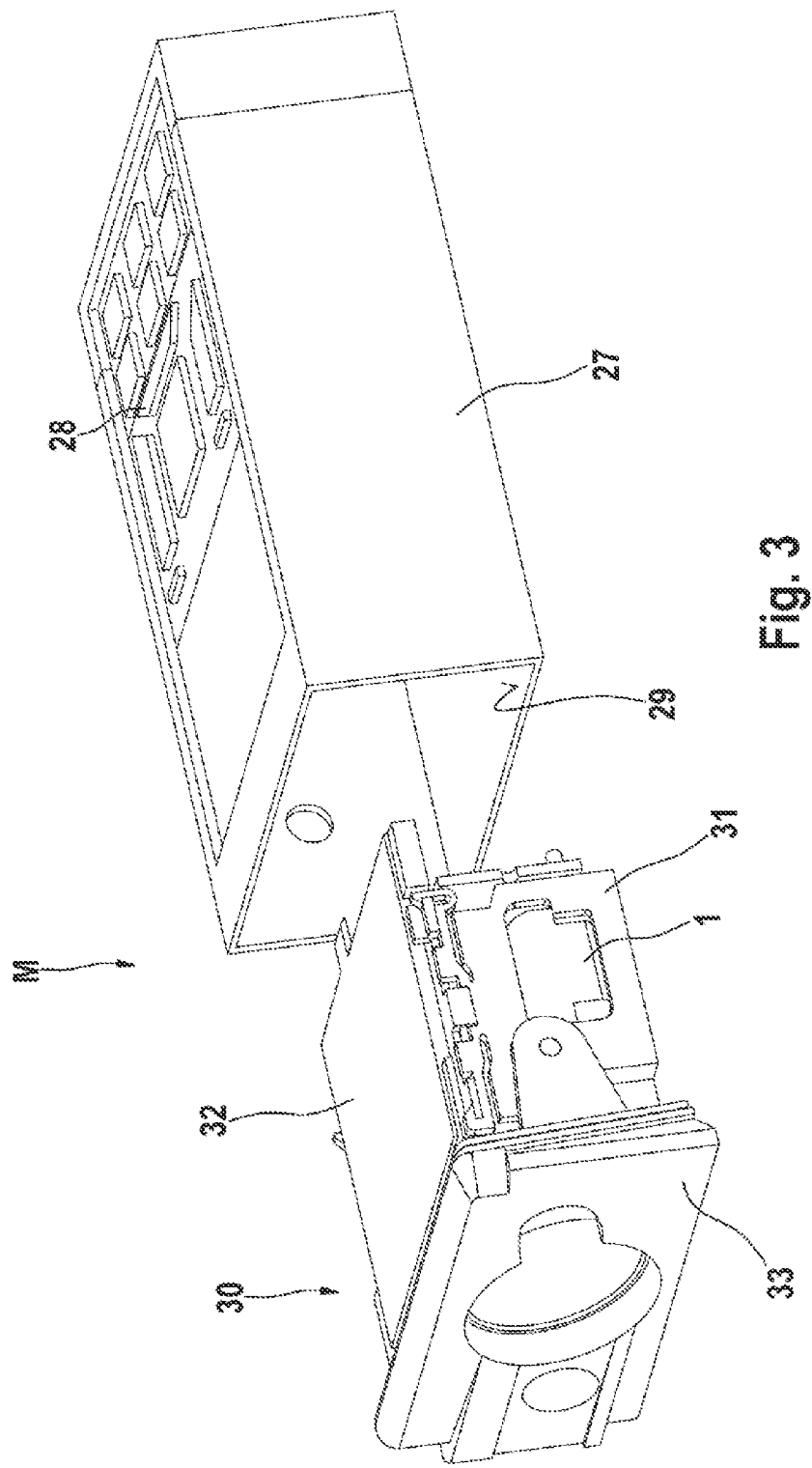
FIG. 3 shows the subassembly from FIG. 1 with a display provided thereon, for mounting in a housing of a laser rangefinder.
Figure 4:
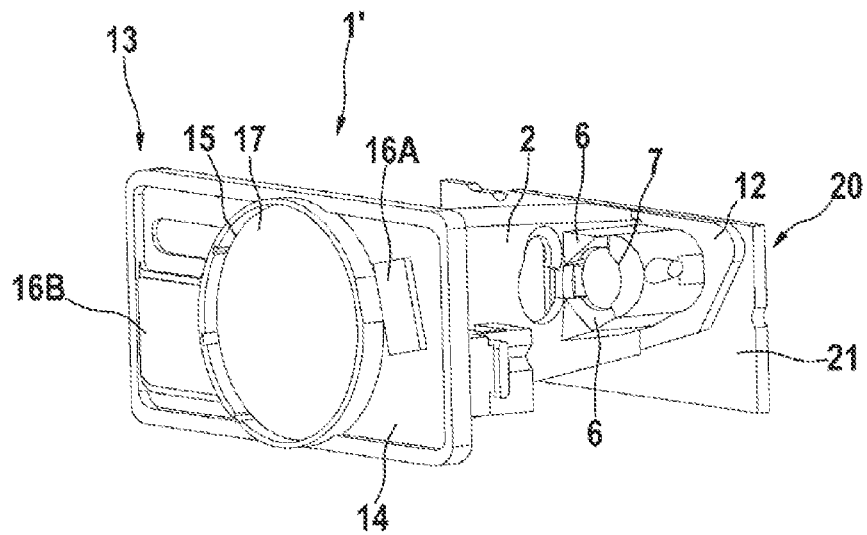
FIG. 4 shows an optical system support according to the disclosure as provided by a second embodiment of the present disclosure, which is formed integrally with a lens holder, in a perspective view.
Figure 5:
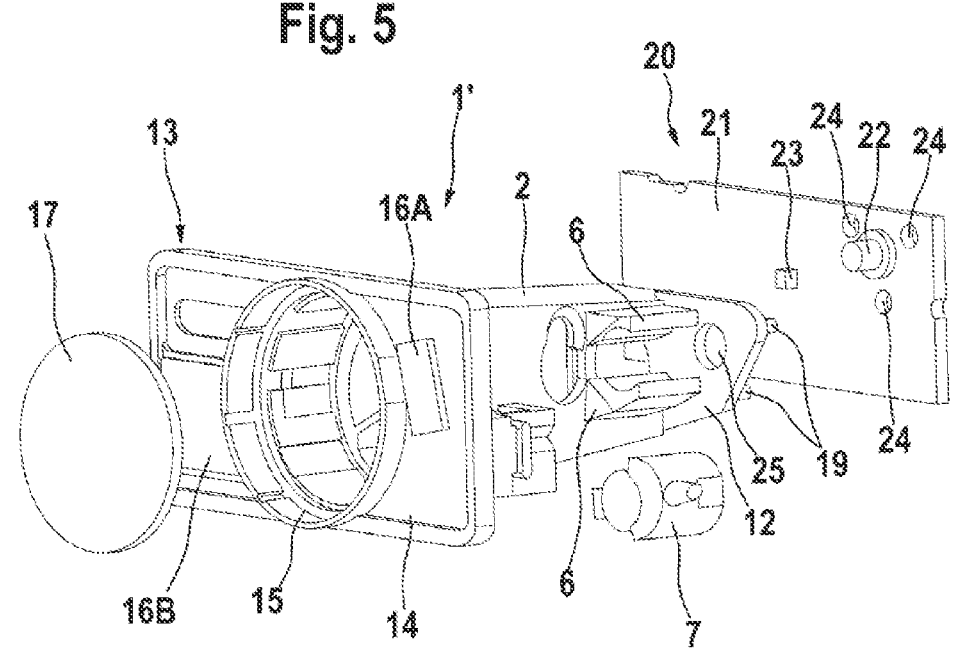
FIG. 5 shows the optical system support from FIG. 3 with a transceiver unit, in an exploded representation.

In FIG. 3, the measuring device is shown in its entirety. It comprises a housing 27 with an operating unit 28, which has an opening 29 in the end face. Also provided is a measuring unit 30, which includes as a central element the previously described optical system support 1 with the components held thereon. The optical system support 1 is surrounded by a U-shaped display holder 31, which holds a display 32 between the free ends of its legs. The lens holder 13 attached to the optical system support 1 is surrounded on its outer side by a rubber sleeve 33, which is mounted on the display holder 31. This measuring unit 30 is inserted into the housing 27 from the open end face, the rubber sleeve 33 closing the opening 29 in the end face. Additionally provided in the housing 27 is an energy supply unit (not shown). In FIGS. 4 and 5, an optical system support 1' as provided by a second embodiment of the present disclosure is shown. The optical system support 1' of the second embodiment is largely identical to that of the first embodiment, for which reason identical reference signs are used for the same components.

The optical system support 1' comprises a basic body 2 with two lateral positioning and fastening elements 6, on which, as before, a collimator lens with a holder 7 is held. At its front end, the basic body 2 is formed integrally with a lens holder 13. As in the first embodiment, the lens holder 13 comprises a front plate 14 with a central tubular receptacle 15 and two lateral windows 16A, 16B. A lens 17 has been inserted into the tubular receptacle 15 from the outside.

Provided on the rear end of the basic body 2 is a rear end flange 12, which is formed identically to that from the first embodiment. Attached thereto is a transceiver unit 20, which is identical to that from the first embodiment.

In spite of the slightly different structure of the optical system support 1' in comparison to that of the first embodiment, the arrangement of the individual components is identical to that in the exemplary embodiment described above. Consequently, optical axes that are in principle identical and identical operating modes of the individual components are obtained. In the second embodiment, a reference flap unit that is not explicitly shown and a target optical system module may be attached to the optical system support 1', as previously described. The function of a measuring device M that is formed as described above with reference to FIG. 3 for the first embodiment is identical to that of the first embodiment.

The invention claimed is:

1. An optical system support for an optical measuring device, comprising:
an elongated ceramic one-piece basic body having an axial length and an integral fixing structure configured to fix an electro-optical transceiver system thereto, the basic body defining a tubular receptacle passing axially through the body along said axial length, said receptacle open at both ends of said basic body and configured to align with a portion of the transceiver system fixed thereto, wherein the basic body is produced from a sintered ceramic that is at least partially transparent in at least a UV wavelength range.

2. The optical system support as claimed in claim 1, wherein the basic body further has positioning and fastening elements on the outside of the body, configured to mount a lens to the basic body.

3. The optical system support as claimed in claim 1, wherein the fixing structure includes at least one axial projection configured to mate with an attachment structure of the electro-optical transceiver unit.

4. The optical system support as claimed in claim 1, wherein the basic body is produced from $Al_2O_3$ ceramic or an $Al_2O_3$ and $ZrO_3$ ceramic.

5. The optical system support as claimed in claim 1, wherein a lens holder is formed integrally with the basic body.

6. The optical system support as claimed in claim 1, wherein a lens holder is provided and is formed with a tubular receptacle for at least one lens, the optical system support being configured to be connected to the lens holder.

7. The optical system support as claimed in claim 6, wherein the tubular receptacle is designed for receiving two lenses lying one behind the other, which is configured to be inserted into the lens holder from opposite end regions.

8. The optical system support as claimed in claim 1, wherein at least one receptacle is defined in the basic body, which extends between the end regions and into which a tube with a bandpass filter is configured to be inserted.

9. An optical measuring device, comprising:
a lens holder,
an optical system support, and
a transceiver system,
wherein the optical system support includes an elongated sintered ceramic one-piece basic body having an axial length and an integral fixing structure configured to fix the transceiver system thereto and defining a tubular-shaped receptacle configured to receive the lens holder and extending along said axial length and open at both ends of said basic body.

10. The optical measuring device as claimed in claim 9, wherein the transceiver system comprises a printed circuit board with a laser diode and a light-sensitive diode, and the printed circuit board has a recess corresponding to a projection of the fixing structure of the basic body, into which recess the projection is inserted to align the circuit board so that one of said laser diode and said light-sensitive diode is aligned with the tubular-shaped receptacle.

11. The optical system support as claimed in claim 1, wherein the optical system support is produced by a ceramic injection molding process.

12. The optical system support as claimed in claim 11, wherein the ceramic injection molding process is carried out with an $Al_2O_3$ ceramic.

13. The optical system support as claimed in claim 11, wherein the ceramic injection molding process is carried out with an $Al_2O_3$ and $ZrO_3$ ceramic.

14. The optical system support as claimed in claim 2, wherein the lens is a collimator lens.

* * * * *